July 12, 1960 R. C. EVANS 2,944,642
DISMANTLEABLE FRAMING STRUCTURES
Filed Oct. 4, 1956 2 Sheets-Sheet 1
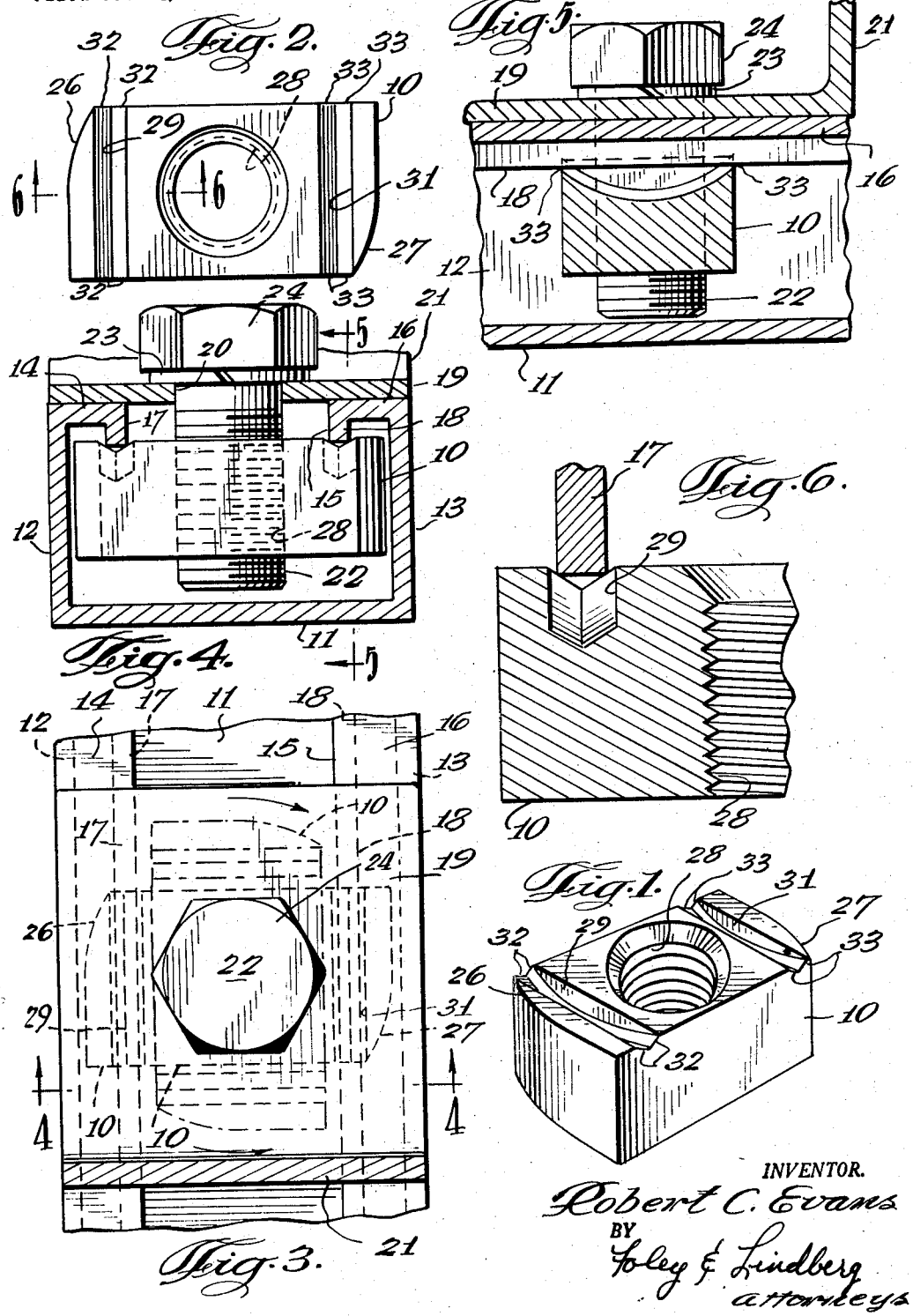
INVENTOR.
Robert C. Evans
BY
Foley & Lindberg
attorneys July 12, 1960 R. C. EVANS 2,944,642
DISMANTLEABLE FRAMING STRUCTURES
Filed Oct. 4, 1956 2 Sheets-Sheet 2
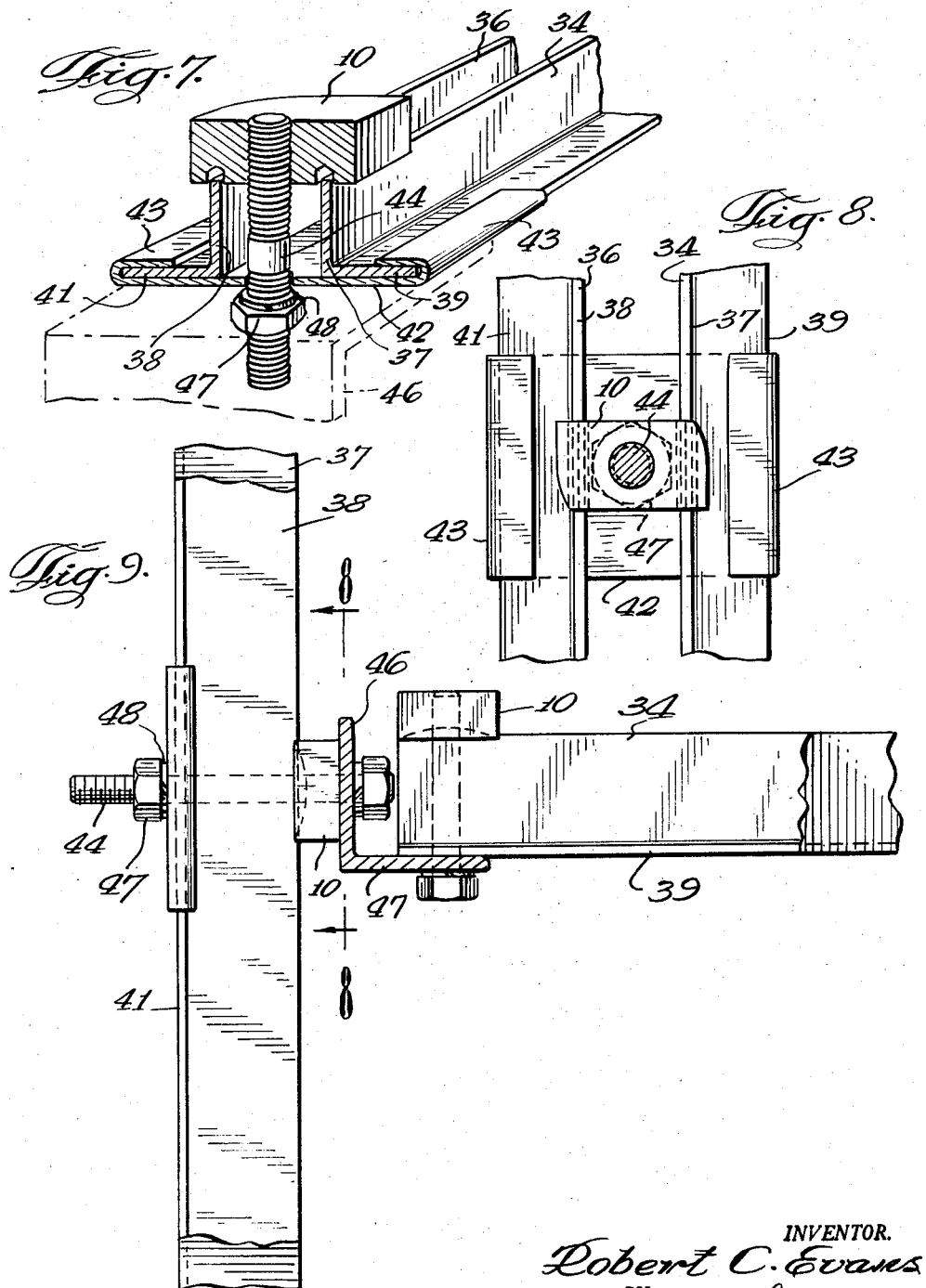
INVENTOR.
Robert C. Evans
BY
Foley & Lindberg
Attorneys

United States Patent Office 2,944,642
Patented July 12, 1960

2,944,642
DISMANTLEABLE FRAMING STRUCTURES

Robert C. Evans, 14901 S. Michigan Ave., Dolton, Ill.

Filed Oct. 4, 1956, Ser. No. 613,933

1 Claim. (Cl. 189—36)

This invention relates generally to dismantleable framing structures and more particularly to an improved connector nut for such structures.

It is a principal object of this invention to provide a dismantleable framing structure characterized by a connector nut for the framing members having a greater loading capacity than has been possible heretofore.

Another object is to provide a connector nut for dismantleable framing of the type where the connector nuts grip the edges of the flanges of the framing members.

Still another object is to provide a connector nut characterized by slots or grooves having an arcuate contour to afford a plurality of knife like edges for engagement with the flanges of the framing members so as to make a rigid but dismantleable connection.

Other objects and important features of the invention will be apparent from a study of the specification following taken with the drawings which together show a preferred embodiment of the invention and a number of applications thereof in connecting dismantleable framing members. Other embodiments of the invention may be suggested to those having the benefit of the teachings herein, and such other embodiments are intended to be reserved especially as they fall within the scope and purview of the subjoined claim.

In the drawings:

Fig. 1 is a perspective view of an improved connector nut for dismantleable framing structures, such connector nut being constructed according to the present invention;

Fig. 2 is a plan view thereof;

Fig. 3 is an elevational view of a framing member, and showing a connector angle held thereto by means of the improved connector nut according to the present invention;

Fig. 4 is a section taken along the line 4—4 of Fig. 3 looking in the direction of the arrows, showing how the improved connector nut cooperates with the framing member to make a firm connection;

Fig. 5 is a section taken along the line 5—5 of Fig. 4 looking in the direction of the arrows;

Fig. 6 is a section to a larger scale taken along the line 6—6 of Fig. 2 looking in the direction of the arrows;

Fig. 7 is a perspective view showing how the connector nut according to the present invention may be employed with framing members of a different type from that disclosed in Figs. 3, 4 and 5;

Fig. 8 is a plan view of the structure seen in Fig. 7; and

Fig. 9 is an elevational view showing how the connector nut can be used with a connector angle for the framing of members extending laterally from a member of the type as seen in Fig. 7.

Referring now to Figs. 1 to 5 of the drawings, the improved connector nut according to the present invention is indicated generally by the reference numeral 10 and may be employed to connect framing members of the box type as seen in Figs. 3 and 4. Framing of the type referred to consists of a continuous web 11 with spaced parallel flanges 12 and 13, the ends of the flanges 12 and 13 being turned toward each other as at 14 and 16, and being inturned to provide a pair of inturned flat edge flanges 17 and 18 which extend toward the web 11, and to define a longitudinally extending slot 15 therebetween.

The faces of the portions 14 and 16 provide bearing for a leg 19 of a connector angle or other connecting means, and in the case of an angle connector, the angle has an outstanding leg 21 extending in a direction perpendicular to the longitudinal axis of the box section shown. The leg 19 has a drilled hole 20 therein to receive a cap screw 22 in threaded engagement with the connector nut 10, a lock washer 23 being interposed between the angle leg 19 and a head 24 of the cap screw 22.

The dimension of the fastener 10 and the width of the slot 15 is such that the fastener 10 can first be placed in the dotted line position seen in Fig. 3 and then swiveled to a position shown where the fastener 10 spans the distance between the inturned flanges 17 and 18, and bears thereagainst.

The improved connector 10 is formed from a blank made in a parting operation, during which parting operation diagonal rounded corners 26 and 27 may conveniently be formed on the blank. The blank is then drilled and tapped to provide a threaded aperture 28 to receive the cap screw 22 or other fastening device. A pair of slots 29 and 31 are then milled in the blank 10, and such slots are maintained a distance apart corresponding to the spacing of the inturned flanges 17 and 18.

In the form of connector seen in Fig. 1, the slots 29 and 31 are preferably formed by a rotating disk shaped milling cutter, not shown, having a V-shaped cutting edge, the axis of the milling cutter lying on a plane including the long axis of the blank, and the plane of the cutter being preferably perpendicular to the long axis of the blank.

With the use of a disk type milling cutter having a V-edge each of the slots 29 and 31 will have an arcuate contour in a plane corresponding to the plane of the flanges 17 or 18, or in a plane normal to the long axis of the connector nut 10. The formation of the slots 29 and 31 in the connector nut 10 with a milling cutter having a V-edge will result in a pair of knife edges 32, 32 at each end of the slot 29 and corresponding knife edges 33, 33, at each end of the slot 31.

While the use of a disk type cutter having a V-edge is to be preferred, since it will result in eight knife edges on the sides of the connector 10, other forms of milling cutters may likewise be employed. For example, it is possible to employ a rotating disk type milling cutter having a flat cutting edge. The provision of such a cutter would result in the milled slots 29 and 31 having a rectangular cross section and intersecting the sides of the blank to give four knife edges.

Likewise, the milling cutter could have a toroidal shaped cutting edge to provide knife edges lying on a circle, a center of which corresponds to the center of the circular cutting edge of the milling cutter.

At the conclusion of the forming operation described, the blank is appropriately heat treated to give a case with a depth of not more than .005" nor less than .003". Thereafter, the connector may be zinc or otherwise plated. The connector may be also made from non-ferrous alloys where electrolytic action is encountered.

The contour of the slots 29 and 31 and their spacing corresponding to the spacing of the flanges 17 and 18 is such that the knife edges will tightly grip the edges of the flanges 17 and 18 upon turning of the connecting screw 22. Laboratory tests of a connector constructed in accordance with the present invention show that a considerably greater holding capacity results. A competing type of connector employing a standard one-half inch No. 13 cap bolt with mating nut threadably engaged with 65 foot-pounds of applied torque gave a maximum holding power against sliding on the framing members of 3600 pounds. This maximum could be achieved only 60% of the time, and during the remaining 40% of the time the holding capacity varied from a low of 1600 pounds to a high of 2200 pounds.

Another form of competing connector nut with the same torque applied thereto gave a maximum holding strength of 4400 pounds in only 40% of the tests. In remaining tests the maximum holding power was not more than 3600 pounds.

A framing connection employing a connector nut as disclosed in this application consistently gave a holding value of 5500 pounds without failure, the same torque being applied in the assembly as in the cases with the competing forms of connectors.

Referring now to Figs. 7 to 9 of the drawings, the connector nut may equally as well be applied to other forms of dismantleable framing members than those shown with respect to Figs. 3, 4 and 5. Such framing may include a pair of angles 34 and 36 having upstanding legs 37 and 38 and legs 39 and 41 extending in a common plane. The angles 34 and 36 can be held in the manner seen in Figs. 7 and 8 by means of a clip 42 having its ends 43 wrapped around the legs 39 and 41. The clip 42 may be in the form as shown crimped at 43 about the legs 39 and 41 or may be supplied to the job site in the form of a U, then being crimped at 43 about the legs 39 and 42 at the job site.

The clip 42 has a suitable aperture to receive a threaded connecting stud 44 which threadably engages with the connector nut 10 seen in Figs. 3, 4 and 5. The stud 44 is employed to hold a connector bracket 46 against the clip 42, a nut 47 and a lock washer 48 being employed to hold the assembly securely.

Referring now to Fig. 9, the stud 44 may alternately have the bracket or angle 46 held against the connector nut 10, the angle 46 having a horizontally extending leg 47 to which is connected framing members also constructed as seen in Fig. 7.

In any form of dismantleable framing members, whether they be of the form as seen in Figs. 3, 4 and 5 or of the form as seen in Figs. 7, 8 and 9, the connector nut affords a connection having greater holding power than has been possible with connectors previously known in the industry.

While the invention has been described in terms of a number of preferred embodiments thereof, and in connection with framing members of different forms, the scope of the invention is not intended to be limited by the forms and examples described herein, nor otherwise by the claim here appended.

I claim as my invention:

The combination of a framing member and a connecting nut wherein said framing member has a pair of spaced square edge flanges and said connector nut has spaced slots therein, each of which is engaged with the square edge of a flange of said pair of square edge flanges; the improvement in said combination wherein each of said slots extends for the width of said connector nut and the width of each slot is greater than the thickness of a flange engaged in said slot, each of said slots being deeper throughout the intermediate portions than at the ends thereof forming a knife edge at each end of each slot, said knife edges of each slot being in engagement with the square edge of an aforesaid flange.

References Cited in the file of this patent

UNITED STATES PATENTS

| | | |
|---|---|---|
| 2,187,314 | Greulich | Jan. 16, 1940 |
| 2,676,680 | Kindorf | Apr. 27, 1954 |
| 2,696,139 | Attwood | Dec. 7, 1954 |
| 2,767,609 | Cousino | Oct. 23, 1956 |